Patented Nov. 19, 1940

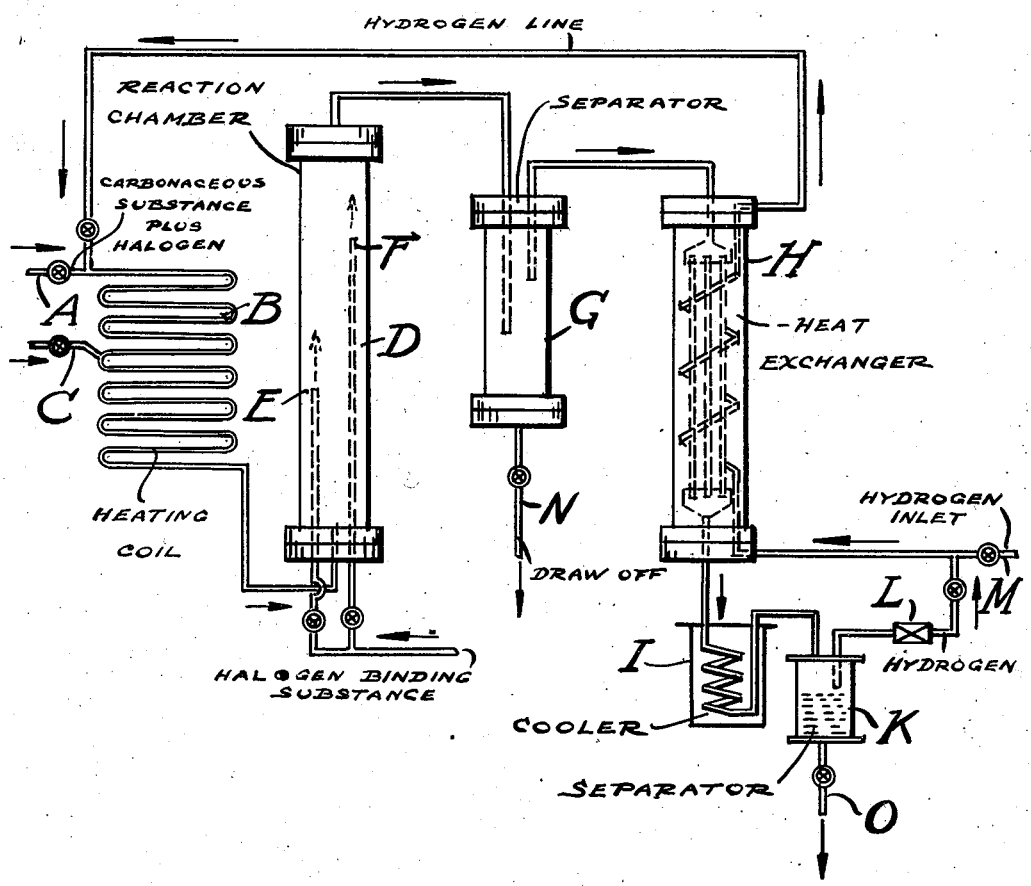

2,221,952

UNITED STATES PATENT OFFICE 2,221,952

PRODUCTION OF VALUABLE CARBONACEOUS SUBSTANCES

Mathias Pier, Heidelberg, Wilhelm Urban, Gelsenkirchen-Buer, and Ernst Donath, Mannheim, Germany, assignors to Standard-I. G. Company, Linden, N. J., a corporation of Delaware Original application September 19, 1935, Serial No. 41,254. Divided and this application January 8, 1938, Serial No. 184,022. In Germany September 25, 1934

7 Claims. (Cl. 196—52)

This application which has been divided out from our copending application Ser. No. 41,254, filed September 19, 1935, relates to improvements in the production of valuable carbonaceous substances.

It has already been proposed to prepare valuable carbonaceous substances from coals, tars, mineral oils, and their liquid distillation, destructive hydrogenation or cracking products by heat treatment in the presence of substances comprising halogens or halogen hydrides, i. e. of halogens or halogen hydrides themselves or of substances supplying halogens or halogen hydrides under the working conditions, preferably while adding hydrogen under pressure. This process results in the disadvantage that the halogen, especially chlorine, which leaves the reaction chamber together with the reaction products causes corrosion in the pipes behind the reaction vessel and/or in the heat exchanger. This corrosion is especially marked in the temperature range in which water commences to condense and/or halogen compounds, as for example ammonium chloride, commence to separate. In order to avoid this disadvantage several proposals have already been made, as for example washing the reaction products with alkaline solutions or lining the endangered parts with expensive materials, as for example noble metals.

We have now found that the said corrosion is prevented in a much more simple manner by working with an addition of substances such that halogen and/or halogen hydrides are bound towards the end of the reaction. As such substances may be mentioned carbonates and sulphides. It is advantageous to employ the corresponding compound of the alkali or alkaline earth metals. These substances, which react comparatively readily with halogen or hydrogen halides, are preferably first introduced into the reaction vessel when the reaction is practically completed so that the combination of the halogen is effected simultaneously with the end of the reaction. If the process be carried out while employing several vessels arranged one behind another the substances combining with the halogens are preferably introduced into the last vessel.

It is especially suitable to employ substances which must first undergo a change by reduction before they are capable of forming a compound with the halogen or halogen hydride. These substances may be mixed with the initial material or added during the reaction and then towards the end of the reaction are converted into substances capable of combining with halogen or halogen hydrides. It is preferable to employ neutral or, if desired, slightly alkaline substances. They may also exert a catalytic action on the reaction. Such substances are for example sulphates, sulphites and phosphates. The corresponding alkali metal, alkaline earth metal or zinc compounds are also suitable. The sulphates and sulphites of the alkali metals have proved especially suitable; the phosphates of sodium and potassium are also very suitable. The substances may also be applied to carriers, such as active carbon, lignite coke, or hydrogenation residues of coal. The place in the apparatus at which the addition of the substances combining with halogens is effected is determined by the speed of reaction of the added substances (which is dependent on the reaction conditions), by the amount of free halogen present in the reaction vessel and by the speed of flow of the reaction components; the addition must be effected so correctly that when the reaction products leave the reaction vessel the halogen is present in a combined form.

The substances binding halogens or halogen hydrides may be introduced into the reaction vessel mixed with the initial materials or dissolved or suspended in a liquid (e. g. water or oil) or formed with it to a paste.

Accelerators may be incorporated with the addition substances, gases or initial materials.

In cases of cracking reaction, when a satisfactory reduction of the added substances does not directly take place, hydrogen or other reducing gases, such as carbon monoxide, may be added.

When working in the vapor or gas phase, as for example when working up middle oils, benzines, phenols or gaseous hydrocarbons, as for example ethane or propane, the substances combining with the halogens, if desired together with other catalytic substances, are preferably applied in the latter part of the reaction vessel or in a vessel arranged behind the latter.

When working up solid or high boiling initial materials, for which the process is especially suitable, catalytic materials, such as metals or metal compounds, especially of the 2nd to 8th groups of the periodic system, as for example zinc, cadmium, aluminium, silicon, titanium, germanium, tin, lead, vanadium, chromium, tungsten, molybdenum, uranium, manganese, rhenium, iron, nickel, cobalt or copper or their oxides, sulphides, halides or acid salts may be added thereto. The initial materials are heated to the desired reaction temperature of from 300° to 600° C. or more, for example in gas-heated pipes and then led into a widened reaction vessel. The reaction is preferably carried out under a pressure of from 20 to 200 atmospheres or more. The presence of hydrogen has proved especially advantageous; in this case it is preferable to employ pressures of from 100 to 500 atmospheres or more.

Halogen or halogen compounds are supplied to the initial material before or during the reaction, as for example after the heating. Besides or instead of halogen (chlorine or iodine or bromine) and hydrogen compounds of halogen it is advantageous to employ non-metal halides as for example carbon tetrachloride, ethylene chloride, methylene chloride, ethyl chloride, methyl chloride, benzoyl chloride, chlorbenzene, sulphur monochloride, sulphur tetrachloride, selenium monochloride, phosphorus trichloride or the corresponding compounds of other halogens or also ammonium chloride.

In the accompanying drawing the single figure is a diagrammatic representation of suitable apparatus for carrying out the process described herein.

The following examples will further illustrate the nature of this invention but the invention is not restricted to these examples.

Example 1

Finely ground mineral coal is made into a paste in the proportions 1:1 with a heavy oil derived from the same coal. 0.01 per cent of molybdic acid, 1.5 per cent of sodium sulphate and 1.1 per cent of ammonium chloride (with reference to the coal) are added to the mixture.

The coal pulp together with hydrogen under a pressure of 250 atmospheres is then heated to 440° C. in a gas-heated pipe system and then led into a wider non-heated reaction vessel in which a temperature of 460° C. is maintained. Before entry into this vessel there is added to the reaction material 0.01 per cent of molybdic acid (with reference to the coal) which is dispersed in a heavy oil free from asphalt. Behind the reaction vessel is arranged another vessel in which the separation of the high-boiling and solid constituents from the vaporous products takes place. The coal is converted to the extent of 95 per cent, mainly into liquid products. The liquid and vaporous products leaving the reaction mixture contain the chlorine in combined form so that corrosion of the parts of the apparatus connected with the reaction vessel does not take place, even after working for long periods.

Example 2

Finely ground gas flame coal from the Ruhr district which has been mechanically freed from ashes down to an ash content of 4 per cent is soaked with 0.02 per cent of molybdic acid (with reference to the coal) and made into a paste in the ratio of 1:1 with a heavy oil derived from the same coal. To the coal pulp there are added 1.1 per cent of ammonium chloride calculated with reference to coal. The resulting mixture together with hydrogen is then heated to 440° C. in a gas-heated pre-heater under a pressure of 250 atmospheres and then led through two wider reaction vessels which are arranged behind one another and in which a temperature of 460° C. is maintained. Before entry into the reaction vessels there is added to the reaction material 0.01 per cent of molybdic acid (with reference to the coal) which is dispersed in a heavy oil free from asphalt. At the upper part of the last reaction vessel near the outlet for the reaction products there are added, with the aid of a pipe, 1.3 per cent of anhydrous finely ground sodium carbonate (with reference to the coal) which is suspended in heavy oil. Behind the reaction vessels is arranged another vessel in which the separation of the high-boiling and solid constituents from the vaporous products takes place. The coal is converted to the extent of 95 per cent, mainly into liquid products. The chlorine contained in the reaction products is attached to sodium and causes no harm whatever to the apparatus.

What we claim is:

1. In the process for the production of valuable carbonaceous substances from combustible distillable carbonaceous material of the nature of coals, tars, mineral oils and their liquid distillation, destructive hydrogenation or cracking products by treating said material at temperatures above about 300° C. in the presence of small amounts of substances selected from the group consisting of halogens and halogen hydrides, the improvement involving the prevention of corrosion of the apparatus while utilizing the effect of said halogens and halogen hydrides in the reaction comprising carrying out the treatment with the addition of a substance, which in the course of the process is transformed into a reduction product which is capable of binding said halogens and halogen hydrides, in such an amount that there is a sufficient quantity of the reduced product to bind substantially all of said halogens and halogen hydrides and in the presence of a reducing agent for said substance.

2. A process as claimed in claim 1 which comprises adding the substances capable of binding halogens or halogen hydrides when changed by reduction to the initial material before the reaction.

3. A process as claimed in claim 1 which comprises adding the substances capable of binding halogens or halogen hydrides when changed by reduction to the treated materials during the reaction.

4. A process as claimed in claim 1 which comprises adding as substances capable of binding halogens or halogen hydrides when changed by reduction such as are selected from the group consisting of the sulphates and sulphites of the alkali metals.

5. A process as claimed in claim 1 which comprises working under a pressure of at least 20 atmospheres.

6. A process as claimed in claim 1, which comprises working in the presence of hydrogen.

7. A process as claimed in claim 1, which comprises working in the presence of hydrogen under a pressure of at least 20 atmospheres and adding as substances capable of binding halogens or halogen hydrides when changed by reduction, such as are selected from the group consisting of the sulphates and sulphites of the alkali metals.

MATHIAS PIER.
WILHELM URBAN.
ERNST DONATH.